United States Patent
Howson et al.

(10) Patent No.: US 11,302,334 B2
(45) Date of Patent: Apr. 12, 2022

(54) METHOD FOR ASSOCIATING A DEVICE WITH A SPEAKER IN A GATEWAY, CORRESPONDING COMPUTER PROGRAM, COMPUTER AND APPARATUS

(71) Applicant: INTERDIGITAL CE PATENT HOLDINGS, Paris (FR)

(72) Inventors: Christopher Howson, Corps-Nuds (FR); Philippe Gilberton, Geveze (FR); Patrick Fontaine, Rennes (FR); Christoph Neumann, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 151 days.

(21) Appl. No.: 16/228,903

(22) Filed: Dec. 21, 2018

(65) Prior Publication Data

US 2019/0198023 A1 Jun. 27, 2019

(30) Foreign Application Priority Data

Dec. 21, 2017 (EP) .................................... 17306887

(51) Int. Cl.
| | |
|---|---|
| *G10L 17/00* | (2013.01) |
| *H04L 12/28* | (2006.01) |
| *G06N 20/00* | (2019.01) |
| *G06N 7/00* | (2006.01) |
| *G10L 15/14* | (2006.01) |
| *G10L 15/30* | (2013.01) |
| *G10L 21/0308* | (2013.01) |
| *G10L 25/24* | (2013.01) |

(52) U.S. Cl.
CPC .............. *G10L 17/00* (2013.01); *G06N 7/005* (2013.01); *G06N 20/00* (2019.01); *G10L 15/14* (2013.01); *G10L 15/30* (2013.01); *G10L 21/0308* (2013.01); *G10L 25/24* (2013.01); *H04L 12/2809* (2013.01)

(58) Field of Classification Search
None
See application file for complete search history.

(56) References Cited

U.S. PATENT DOCUMENTS

| | | | |
|---|---|---|---|
| 7,503,065 B1 | 3/2009 | Packingham et al. | |
| 8,284,764 B1 | 10/2012 | Nucci et al. | |
| 9,535,675 B2 | 1/2017 | Mohamad Abdul et al. | |
| 2011/0288866 A1* | 11/2011 | Rasmussen | G10L 17/06 704/246 |
| 2012/0084087 A1 | 4/2012 | Yang et al. | |

(Continued)

FOREIGN PATENT DOCUMENTS

EP 2053783 A1 4/2009

OTHER PUBLICATIONS

Backes, Michael et al. "Speaker recognition in encrypted voice streams." European Symposium on Research in Computer Security. Springer, Berlin, Heidelberg, 2010.

*Primary Examiner* — Antim G Shah
(74) *Attorney, Agent, or Firm* — Invention Mine LLC

(57) ABSTRACT

The present disclosure proposes a solution to associate a device with a user by capturing a voice of a speaker by a microphone connected to the network device (e.g. a residential or home gateway), monitoring the IP traffic of the network device and detecting the device contributing to this IP traffic in order to establish a link between the speaker and his device(s) and associate the device with the speaker.

14 Claims, 4 Drawing Sheets

(56) References Cited

U.S. PATENT DOCUMENTS

| | | | |
|---|---|---|---|
| 2013/0138740 A1* | 5/2013 | Crinon | H04L 65/4038 709/204 |
| 2014/0046664 A1 | 2/2014 | Sarkar et al. | |
| 2015/0082404 A1* | 3/2015 | Goldstein | H04W 4/029 726/7 |
| 2015/0228278 A1* | 8/2015 | Huang | G10L 17/04 382/118 |
| 2016/0269445 A1 | 9/2016 | Dotterer, III et al. | |

* cited by examiner

METHOD FOR ASSOCIATING A DEVICE WITH A SPEAKER IN A GATEWAY, CORRESPONDING COMPUTER PROGRAM, COMPUTER AND APPARATUS

1. REFERENCE TO RELATED EUROPEAN APPLICATION

This application claims priority from European Patent Application No. 17306887.5, entitled "METHOD FOR ASSOCIATING A DEVICE WITH A SPEAKER IN A GATEWAY, CORRESPONDING COMPUTER PROGRAM COMPUTER AND APPARATUS", filed on Dec. 21, 2017, the contents of which are hereby incorporated by reference in its entirety.

2. TECHNICAL FIELD

The present invention relates generally to the field of speaker recognition. The invention relates more specifically to a method for associating a device with a speaker in a network device, for example a home gateway.

3. BACKGROUND ART

Recently several initiatives have been launched to integrate voice interfaces, such Alexa™, Siri™, OK Google™, in home gateways. In a home gateway, the voice interface can provide access to various kinds of services including controlling the home network configuration and/or the network access rights, searching and listening to music . . . . Some of these services require to be able to identify the speaker. For example, in case of a music service, the proposed playlists can adapt to the profile of the user. In the case of home network configuration, some actions such as setting up a Wi-Fi guest network or reinitializing a Wi-Fi password, require specific credentials, which in turn requires to identify and authenticate the speaker.

There exists a set of technologies and methods, such as classification using GMM/UBM models that allow identifying the speaker based on the analysis of the acoustic signal that is recorded when the speaker speaks. In specific conditions (with little noise and a good training dataset) the equal error rate can be small, around 1-5%. However, in the general case the error rate can be higher especially in noisy conditions both for the recording during training dataset or the recording during detection phase.

To tackle the above problem related work on multimodal speaker recognition proposed to use other modalities which decreases the error rate in noisy conditions. One such possible modality is the information regarding presence or absence of wireless devices. The use this particular modality requires however to be able to infer that a user owns or uses a particular device, i.e. it requires to be able to link a user (and its speaker profile) with his wireless device.

So there is a need to find a solution for automatically associating a speaker or user with his device(s). A home gateway is a strategic location for hosting such feature because it is the entry point to a plurality networks (internet, home network, . . . ) for a plurality of devices (phones, computers, PDAs, . . . ). Other network devices such as IoT hub, wireless bridge, extender or router are also good candidates to implement this feature since they handle the network traffic.

In addition, there are a couple of other use-cases that require associating a particular device with a speaker or user profile e.g. to prioritize the traffic of particular user and thus its devices, to restrict access to certain users and its devices.

4. SUMMARY OF INVENTION

The present disclosure proposes a solution to associate a device with a user. This solution proposes capturing a voice of a speaker by a microphone connected to the network device (e.g. a residential or home gateway), monitoring the IP traffic of the network device and detecting the device contributing to this IP traffic in order to establish a link between the speaker and his device(s) and associate the device with the speaker.

Once the association is established, it participates to the process of recognizing a speaker in the sense that, when the device is detected, it can guide the speaker recognition towards the speaker(s) linked to this device. It can also help to increase the speaker recognition accuracy in noisy conditions. It does not require the installation of a dedicated software or application in the device(s). It does not also require any dedicated preliminary configuration phase of the network device. In addition, this is completely transparent for the users. Speaker to device association also allows other features mentioned above such as access control and traffic prioritization.

In a first aspect, the disclosure is directed to a method for associating a device with a speaker, in a network device having a microphone and handling network traffic of a plurality of devices, said method comprising capturing a voice of said speaker by said microphone, extracting first voice features from the captured voice, the first voice features being representative of the temporal voice activity, detecting, in the network traffic of the network device, at least one voice-related stream generated by a device and determining an identifier for the device, extracting traffic features from said at least one voice-related stream, the traffic features being representative of the temporal network activity for the at least one voice-related stream, if first voice features and traffic features are correlated, determining a speaker identifier of said speaker using second voice features representative of speakers and associating said device identifier with said speaker identifier.

According to an embodiment of first aspect, detecting at least one voice-related traffic is done by monitoring specific ip addresses, ip ports or domains. According to an embodiment, the device identifier is a MAC address of the device generating said at least one voice-related stream. According to an embodiment, the first voice features are extracted by voice activity detection on the captured voice.

According to an embodiment of first aspect, determining the speaker identifier is carried out by extracting second voice features from the captured voice, comparing said second voice features with predetermined second voice features of a set of speaker profiles learnt during a supervised enrolment phase and selecting, among said set of speaker profiles, a speaker profile having second voice features closest to those of the captured voice, the speaker identifier being an identifier of the selected speaker profile.

According to an embodiment of first aspect, determining the speaker identifier is carried out by extracting second voice features from the captured voice and comparing said second voice features with second voice features of a set of speaker profiles that have been built by clustering the voices captured by the microphone over at least a time period and selecting (240;340), among the speaker profiles, a speaker profile having second voice features closest to those of the captured voice, the speaker identifier being an identifier of the selected speaker profile.

According to an embodiment of first aspect, said second voice features are at least one of the following group: Mel-frequency cepstral coefficients (MFCC), Bark frequency cepstral coefficients (BFCC), Linear Predictive Cepstrum Coefficients (LPCC). According to an embodiment, the speaker profiles are represented using a Gaussian Mixture Model (GMM).

In a second aspect, the disclosure is directed to apparatus for associating a device with a speaker, said apparatus handling network traffic of a plurality of devices and comprising a microphone configured to capture a voice of said speaker by said microphone, and a processor configured to extract first voice features from the captured voice, the first voice features being representative of the temporal voice activity, detect, in the network traffic of the apparatus, at least one voice-related stream generated by a device and determine an identifier for the device, extract traffic features from said at least one voice-related stream, the traffic features being representative of the temporal network activity for the at least one voice-related stream, and if first voice features and traffic features are correlated, determine a speaker identifier of said speaker using second voice features representative of speakers and associating said device identifier with said speaker identifier.

According to an embodiment of second aspect, detecting at least one voice-related traffic is done by monitoring specific ip addresses, ip ports or domains. According to an embodiment, the device identifier is a MAC address of the device generating said at least one voice-related stream. According to an embodiment, the first voice features are extracted by voice activity detection on the captured voice.

According to an embodiment of second aspect, determining the speaker identifier is carried out by extracting second voice features from the captured voice, comparing said second voice features with predetermined second voice features of a set of speaker profiles learnt during a supervised enrolment phase and selecting, among said set of speaker profiles, a speaker profile having second voice features closest to those of the captured voice, the speaker identifier being an identifier of the selected speaker profile.

According to an embodiment of second aspect, determining the speaker identifier is carried out by extracting second voice features from the captured voice and comparing said second voice features with second voice features of a set of speaker profiles that have been built by clustering the voices captured by the microphone over at least a time period and selecting (240;340), among the speaker profiles, a speaker profile having second voice features closest to those of the captured voice, the speaker identifier being an identifier of the selected speaker profile.

According to an embodiment of second aspect, said second voice features are at least one of the following group: Mel-frequency cepstral coefficients (MFCC), Bark frequency cepstral coefficients (BFCC), Linear Predictive Cepstrum Coefficients (LPCC). According to an embodiment, the speaker profiles are represented using a Gaussian Mixture Model (GMM).

In a third aspect, the disclosure is directed to a computer program product comprising program code instructions for implementing the method as defined hereinabove, when said program is executed on a computer or a processor.

In a fourth aspect, the disclosure is directed to a non-transitory computer-readable storage medium storing a computer program product as defined hereinabove.

5. BRIEF DESCRIPTION OF THE DRAWINGS

The invention can be better understood with reference to the following description and drawings, given by way of example and not limiting the scope of protection, and in which.

Figure 1:
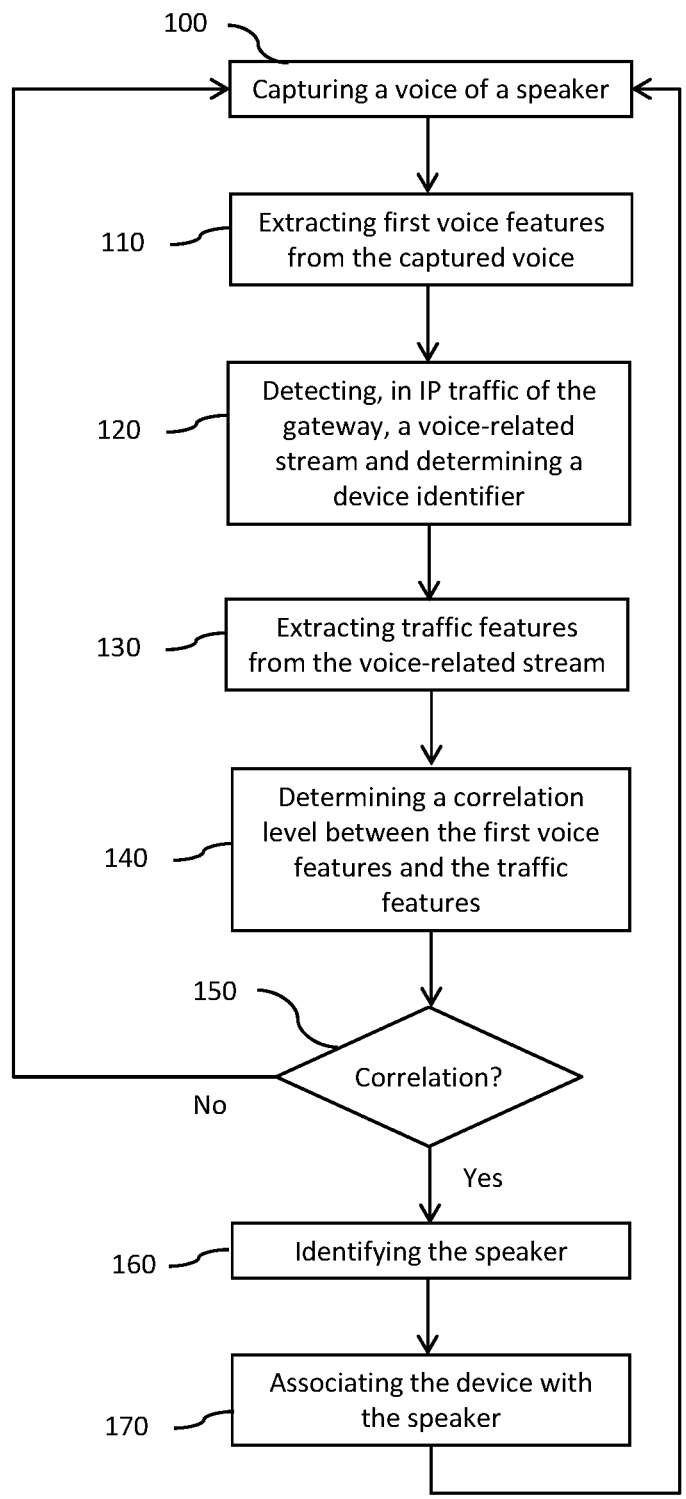
FIG. 1 is a flow chart of the successive steps of a method according to an embodiment of the invention.

The components in the figures are not necessarily to scale, emphasis instead being placed upon illustrating the principles of the invention.

6. DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are given by way of illustration only and shall have no limiting effect on the scope of the claims.

While not explicitly described, the present examples and variants may be employed in any combination or sub-combination.

The present principles are described for speaker recognition and be used for different applications or services. For example, once an association is established between a device and a particular user, a third-party application or service can use this information and sync the service and applications (e.g. browsing histories, playlists, recommendations, etc.) on the device and the network device (e.g. gateway). There are a couple of additional use-cases that also require associating a particular device with a speaker or user profile. E.g. to prioritize the traffic of particular user and thus its devices, to restrict access to certain users and this its devices.

In the following, the "speaker recognition" encompasses "speaker identification" and "Speaker discrimination". The "speaker identification" consists in identifying a person based on voice data and on a set of known speakers. Note that the speaker may be an "outsider" and not part of the known speakers. The "speaker discrimination" consists in differentiating groups of individuals. There exist several use-cases for speaker discrimination such as discriminating home inhabitant versus non-inhabitants, differentiating children versus adults, male versus female, etc.

The task of speaker identification or speaker discrimination can be decomposed in several phases. The enrolment phase refers to the training phase where speakers or groups of speakers are learnt based on a set of recordings and spoken phrases. The verification phase (done after the enrolment phase) refers to the actual identification or discrimination of a speaker or group of speakers based on a recorded audio sample.

The present invention relates to a multimodal speaker recognition. Multimodal speaker recognition consists in using multiple modalities (i.e. more than just the voice audio signal) to identify the speaker. The additional modalities may include video, vibration (e.g. with geophones) or Wi-Fi signals and interferences.

According to the invention, it is proposed to use an additional modality, which is the presence or absence of a particular device, typically reflected by the fact that a wired or wireless device is connected to the network device. This additional modality would notably serve to disambiguate the cases where there is uncertainties on a classical speaker recognition based on voice audio signals.

The present invention proposes capturing a voice of a speaker by a microphone connected to the network device, monitoring the IP traffic of the network device and detecting the device contributing to this IP traffic in order to establish an association between the speaker and his device(s).

FIG. 1 is a flow chart of a speaker recognition method according to an embodiment of the invention. The method will be described hereinafter in the framework a network device equipped with a microphone. This network device is for example a home gateway connected to Internet. Devices, like computers, laptops or smartphones, are connected (by a wired or a wireless connection) to Internet via the gateway. Other devices such as IoT hub, wireless bridge, extender or router could also be used to host the method of FIG. 1.

In a step 100, a voice of a speaker is captured by the microphone of the network device. The microphone may be continuously ON or in response to a specific query or a wake-up word as described later in reference to the unsupervised mode.

In a step 110, first voice features are extracted from the captured voice. The first voice features are representative of the temporal voice activity.

According to an embodiment, the first voice features are extracted by voice activity detection (VAD) on the captured voice. VAD is a technique to detect the presence or absence of human speech. It is used for audio segmentation. So it is able to differentiate the segments with and without human speech. It is also employed by a large number of VoIP services (e.g. Skype,) and protocols (e.g. GSM and UMTS) to reduce the amount volume of transmitted data. The protocol stops transmitting if a speaker is idle.

The voice activity can typically be represented by on and off phases represented for example by a time series of 1 and 0 representing active and inactive periods respectively.

In a step 120, the network device detects voice-related streams, such as VoIP, Skype or WhatsApp, by passively listening and analyzing the IP traffic traversing the network device. This can be achieved by filtering specific port, IP addresses or domains. Note that a voice-related stream encompasses voice assistants that run on mobile devices, such as Sin or OK google. This voice-related stream may be encrypted.

During this step, a device identifier associated with the device generating the detected voice-related stream is also determined. This device identifier is for example a MAC address of the device generating the detected voice-related stream. In a variant, the device identifier is a cookie including information specific to the device generating the detected voice-related stream.

In a step 130, traffic features are extracted from the detected voice-related stream by monitoring the voice over IP traffic within the network device. The traffic is relative to the activity of the network with which the network device is connected.

In a step 140, a correlation level between the extracted first voice features and the extracted traffic features is determined. The cross-correlation of two time series, one time series of traffic features and one time series of first voice features, or the Pearson correlation coefficient between first voice features and the extracted traffic can be used to determine this correlation level.

In a step 150, if the extracted first voice features and the extracted traffic features are correlated, the process goes to step 160. In another embodiment, the correlation level is compared to a predetermined threshold. If the correlation level is above the predetermined threshold (which means that the correlation level is high), the process goes to step 160.

In step 160, the speaker whose voice has been captured through the network device microphone in step 100 is identified and an association is established between the device identifier (obtained in step 120) and the speaker identifier (obtained in step 160) in a step 170.

If the correlation level is below the predetermined threshold (no correlation or low correlation), it is assumed that the voice captured by the microphone of the network device is not the one detected in the traffic and then the association with the device is not established. In an embodiment, a simplified model uses a correlation based on a binary value indicating the detection of a voice activity captured by the microphone (Step 110) and a binary value indicating the detection of voice related traffic on the network (Step 120). With this model, the correlation comparison of step 150 is a simple binary AND function. Such simplified model is operating well in single user environments but more complex temporal correlations is required when multiple users are speaking concurrently on multiple devices.

In the step 170, the speaker whose voice has been captured through the network device microphone in step 100 is identified by associating a speaker identifier with him. This step can be done according to a supervised mode or an unsupervised mode.

The supervised mode comprises an enrolment phase and a verification phase. As mentioned before, the enrolment phase is a training phase where speakers are learnt based on a set of recordings and spoken phrases. The verification phase, which is done after the enrolment phase, refers to the actual identification of a speaker based on the captured voice and the recorded audio samples. Most speaker identification systems use supervised learning, i.e. the learning during the enrolment phase relies on a labeled dataset typically requiring that the speaker provides its identity, e.g. its name. Supervised learning often requires that the speaker repeats a set of phrases during the enrolment phase.

In supervised mode, the step of identifying the speaker is carried out by extracting second voice features from the captured voice, comparing said second voice features with predetermined second voice features of a set of speaker profiles learnt during a supervised enrolment phase and selecting, among said set of speaker profiles, a speaker profile having second voice features closest to those of the captured voice. The speaker identifier associated with the speaker of the captured voice is thus the identifier of the selected speaker profile. This speaker identifier may be the identity or name provided during the enrollment phase.

The second voice features used in step 160 are characteristics allowing speaker recognition and may use standard low-level acoustic features characterized by their time span or specific speaker-related features.

Standard low-level acoustic features characterized by their time span are for example:
- short-term features: Linear-Frequency Cepstral Coefficients (LFCC), Mel-Frequency Cepstral Coefficients (MFCC), LPC (Linear Predictive Coding), LSF (Line Spectral Frequencies), PLP (Perceptual Linear Predictors) . . . ; or
- long-term features: averaged short-term spectrum, energy, formants . . . .

Speaker-related features:
- glottal features: vocal tract (e.g. by LPC)+voice source (inverse filtering); or
- prosodic features: refer to characteristic syllable stress, intonation, rhythm; these features are mostly based on static and dynamic fundamental frequency estimators.

Besides, the speaker profiles can be represented using a Gaussian Mixture Model (GMM) and Universal Background Models (UBM).

In the unsupervised mode, the learning does not require that the speaker provides its identity and also does not require that the speaker repeats a set of phrases during the enrolment phase. The gateway uses diarization for unsupervised learning of speaker profiles. Speaker diarization is a research area involving segmenting audio into speaker homogeneous regions and annotating regions from each individual speaker with a single label in an unsupervised manner. It is generally performed without any a priori knowledge about the speakers being present, not even how many speakers there are. Diarization is often applied to telephone conversations (in call centers), broadcast news, movies, conference meetings, etc. It implies techniques that detect speech, segment the audio timeline and cluster the speaker models. Ideally the result is a number of speaker models equal to the number of speakers in the dataset.

In the unsupervised mode, the network device listens for voices in the home (for a home network device) and build clusters of speaker voices, without being able to associate an explicit identity to the cluster. Such listening is typically done regularly, for example during daytime or when activity is detected at home but could also be done continuously. The clusters are equivalent to speaker profiles. An implicit identifier, such as a cluster id, can be used. In a variant, the network device builds the voice clusters from only detected wake-up words and possibly subsequent spoken commands/queries as a continuous diarization of home audio is likely to be quite error prone. In this embodiment, the step of identifying the speaker is carried out by extracting second voice features from the captured voice and comparing said second voice features with second voice features of a set of speaker profiles that have been built by clustering the voices captured by the microphone over at least a time period and selecting, among the speaker profiles, a speaker profile having second voice features closest to those of the captured voice, the speaker identifier associated with the speaker of the captured voice being an identifier of the selected speaker profile.

Once the speaker identifier is obtained (step 160), an association can then be established between the device identifier (obtained in step 120) and the speaker identifier (obtained in step 160) in the step 170.

The established association can be used for speaker recognition in order to disambiguate a speaker identity. The next time that the network device tries to identify a speaker using audio samples, the network device can use the information whether the device is present or not in order to disambiguate the speaker identity. If a device linked to a speaker is present (the device is connected wirelessly or not to network device), it increases the confidence that the linked speaker is speaking. If the device is not present, it decreases the confidence that the linked speaker is speaking.

In some cases, a device is shared by different users, such as a family phone, and the voice activity of several speakers might correlate with the voice traffic of the device. Therefore, in a variant embodiment, the network device tags a device as "shared" when it detects a strong correlation for a new speaker profile and when the same device is already linked with another speaker profile.

In another embodiment, the speaker identification is only launched when a correlation has been detected, thus avoiding performing unnecessary speaker recognition and this optimizing computing resources.

In another exemplary embodiment, a plurality of devices is used to support the method of FIG. 1. The microphone capturing the voice of the speaker is integrated into a wifi extender and this device transmits the audio signal to the network devices (for example a home gateway) into a dedicated audio stream carried over IP.

Figure 2:
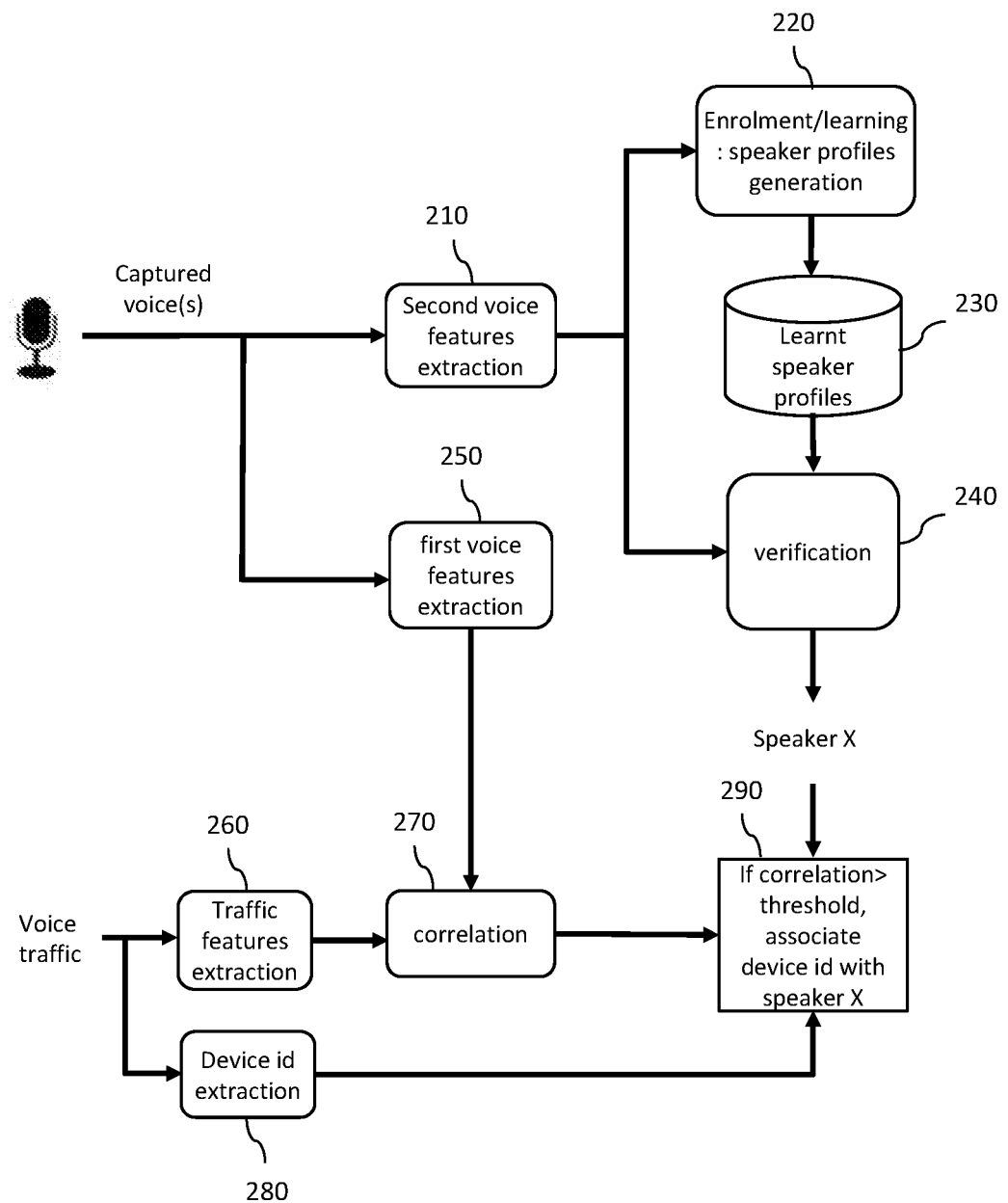
FIG. 2 is a block diagram illustrating the steps of method according to a first embodiment of the invention (supervised mode)

FIG. 2 is a high level block diagram illustrating the different steps and of the speaker recognition method of the invention in a supervised mode, their interaction and their results.

This figure shows the different steps applied to the voice captured by the microphone (upper part of the figure) and to the voice traffic or IP traffic of the network device (upper part of the figure) in a supervised mode.

The voices captured for the enrolment phase and the current voice captured for the verification phase are processed by the module 210. In this module, the second voice features are extracted. The second voice features extracted by the module 210 for the enrolment phase are then processed by the module 220 in order to generate speaker profiles. These speaker profiles are stored in a storage module 230. And the second voice features of the current voice captured for the verification phase are compared to the second voice features of the stored speaker profiles in a module 240. This latter outputs the speaker identifier (Speaker X) associated to the speaker profile corresponding to the current voice. The first voice features of the current voice captured by the microphone are extracted in a module 250.

The lower part of the figure deals with the analysis of the traffic. The traffic features of the IP traffic inside the network device are extracted in module 260.

A correlation level between the first voice features from the module 250 and the traffic features from the module 260 is computed in a module 270.

A device identifier is extracted from the IP traffic in a module 280.

In module 290, the correlation level computed in module 270 is compared to a predetermined threshold. The speaker identifier "speaker X" is linked to the device identifier if the correlation level is above the predetermined threshold.

All the modules 210-220 and 240-290 can be implemented by any processor of the network device. Likewise, the storage module 230 is a storage medium within the network device or connected to it.

Figure 3:
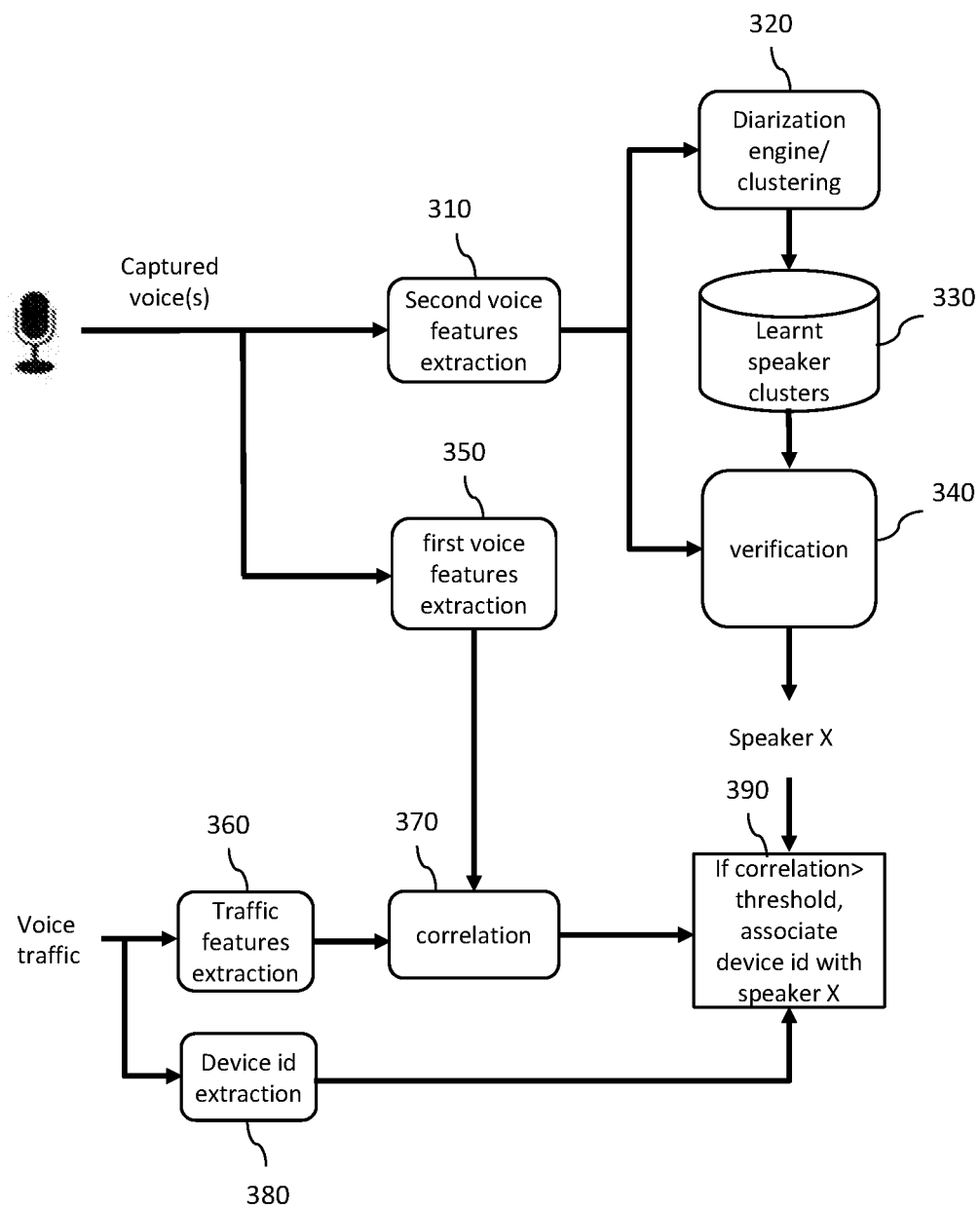
FIG. 3 is a block diagram illustrating the steps of method according to a second embodiment of the invention (unsupervised mode)

FIG. 3 is a high level block diagram illustrating the different steps and of the speaker recognition method of the invention in an unsupervised mode, their interaction and their results.

This figure is almost similar to FIG. 2 except for the learning part. The modules 310, 350, 360, 370, 380 and 390 are similar to the modules 210, 250, 260, 270, 280 and 290 of FIG. 2.

By contrast to FIG. 2, the network device listens voices in the home continuously or on request (by wake-up words). The module 320 builds clusters of speaker voices. These clusters are equivalent to speaker profiles. This operation corresponds to diarization. These speaker profiles or clusters are stored in the module 330. An implicit identifier, such as a cluster id, is allocated to each cluster or profile. The second voice features of the current voice captured for the verification phase are compared to the second voice features of the stored speaker clusters in the module 340. This latter outputs the speaker identifier (Speaker X) associated to the speaker cluster corresponding to the current voice.

In addition, such a link (Speaker identifier<->device identifier) can be used beyond the sole purpose of increasing the speaker recognition performances. For example, once we established that a device is used by a particular user, a third-party application or service can use this information and sync the service and applications (e.g. browsing histories, playlists, recommendations, etc.) on the phone and the network device. A user may own or use several devices, and the method can establish an association for each of these devices, therefore allowing the system to synchronize amongst several devices. Another application is to use the speaker identification to differentiate the available services, comprising for example access control, settings, traffic prioritization, etc. All those services could be depending on the identity of the speaker. For example, kids should not be allowed to change the WiFi password.

Therefore this method presents, among others, the following advantages:
- it increases the speaker detection accuracy in noisy conditions;
- it enables synchronization of profiles across several devices and the network device;
- it enables personalization of services on speaker's device (e.g. the speaker requests to send a file to its mobile device, the speaker requests to give priority to video traffic from 'his' mobile phone, "follow me" use case, etc. . . . );
- it doesn't require to add a dedicated software (app or daemon) in the mobile device.

Figure 4:
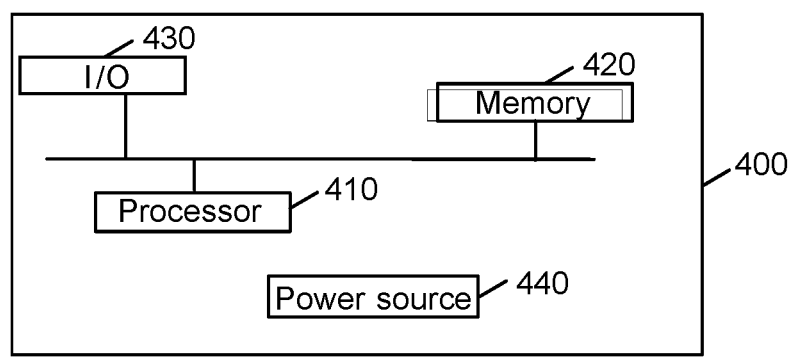
FIG. 4 is a schematic view of an apparatus according to one embodiment of the invention.

An exemplary architecture of a network device or apparatus 400 configured to carry out the steps of FIG. 1 or to implement the modules of FIG. 2 or 3 is given in FIG. 4.

The apparatus 400 comprises one or more processor(s) 410, which is(are), for example, a CPU, a GPU and/or a DSP (English acronym of Digital Signal Processor), along with internal memory 420 (e.g. RAM, ROM, EPROM). The apparatus 400 comprises one or several Input/Output interface(s) 430 adapted to receive or transmit voice information and/or allow a user to enter commands and/or data (e.g. a keyboard, a mouse, a touchpad, a webcam); and a power source 440 which may be external to the apparatus 400. The apparatus 400 comprises at least one network interface(s) (not shown). The voice information may be obtained from a microphone which may be included into the apparatus or may be external to it.

According to an exemplary and non-limitative embodiment of the invention, the apparatus 400 further comprises a computer program stored in the memory 420. The computer program comprises instructions which, when executed by the apparatus 400, in particular by the processor 410, make the apparatus 400 carry out the method described with reference to FIG. 1. According to a variant, the computer program is stored externally to the apparatus 400 on a non-transitory digital data support, e.g. on an external storage medium such as a HDD, CD-ROM, DVD, a read-only and/or DVD drive and/or a DVD Read/Write drive, all known in the art. The apparatus 400 thus comprises an interface to read the computer program. Further, the apparatus 400 could access one or more Universal Serial Bus (USB)-type storage devices (e.g., "memory sticks.") through corresponding USB ports (not shown).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

The invention claimed is:

1. A method for associating a user device with a speaker in a network device having a microphone and handling network traffic generated by at least one of a plurality of user devices, the method comprising:
   extracting first voice features representative of a temporal voice activity captured by the microphone;
   detecting a voice-related network stream generated by at least one user device in the network traffic traversing the network device, and associating a device identifier with the detected voice-related network stream;
   extracting traffic features representative of a temporal activity of network traffic of detected voice-related network streams generated by the at least one user device in the network traffic traversing the network device; and
   when the first voice features and the traffic features are correlated, associating the device identifier with an identifier of the speaker, wherein the identifier of the speaker is determined using second voice features representative of speakers.

2. The method of claim 1, wherein a network stream is determined to be voice-related by monitoring network traffic and detecting specific IP addresses, IP ports, or network domains.

3. The method of claim 1, wherein the user device is identified by a MAC address of the user device generating at least one of the voice-related network streams.

4. The method of claim 1, wherein the speaker identifier is determined by extracting the second voice features from a captured voice, comparing the second voice features with predetermined second voice features of a set of speaker profiles learnt during a supervised enrollment phase, and selecting, from among the set of speaker profiles, a speaker profile having second voice features closest to the second voice features of the captured voice, the speaker identifier being an identifier of the selected speaker profile.

5. The method of claim 1, wherein the speaker identifier is determined by extracting the second voice features from a captured voice, comparing the second voice features with second voice features of a set of speaker profiles that have been built by clustering voices captured by the microphone over at least a time period, and selecting, from among the speaker profiles, a speaker profile having second voice features closest to the second voice features of the captured voice, the speaker identifier being an identifier of the selected speaker profile.

6. The method of claim 4, where the second voice features are selected from the group consisting of:
   Mel-frequency cepstral coefficients (MFCC),
   Bark frequency cepstral coefficients (BFCC), and
   Linear Predictive Cepstrum Coefficients (LPCC).

7. The method of claim 4, where the set of speaker profiles are represented using a Gaussian Mixture Model (GMM).

8. An apparatus for associating a user device with a speaker, the apparatus handling network traffic generated by at least one of a plurality of user devices and comprising a microphone configured to capture a voice of the speaker by the microphone, and a processor configured to:
   extract first voice features representative of a temporal voice activity captured by the microphone;
   detect a voice-related network stream generated by at least one user device in the network traffic traversing the network device, and associate a device identifier with the detected voice-related network stream;
   extract traffic features representative of a temporal activity of network traffic of detected voice-related network streams generated by the at least one device in the network traffic traversing the network device; and
   when the first voice features and the traffic features are correlated, associate the device identifier with an identifier of the speaker, wherein the identifier of the speaker is determined using second voice features representative of speakers.

9. The apparatus of claim 8, wherein a network stream is determined to be voice-related by monitoring network traffic and detecting specific IP addresses, IP ports, or network domains.

10. The apparatus of claim 8, wherein the device identifier is a MAC address of the user device generating at least one of the voice-related network streams.

11. The apparatus of claim 8, wherein the speaker identifier is determined by extracting second voice features from the captured voice, comparing the second voice features with predetermined second voice features of a set of speaker profiles learnt during a supervised enrollment phase, and selecting, from among the set of speaker profiles, a speaker profile having second voice features closest to the second voice features of the captured voice, the speaker identifier being an identifier of the selected speaker profile.

12. The apparatus of claim 8, wherein the speaker identifier is determined by extracting the second voice features from the captured voice, comparing the second voice features with second voice features of a set of speaker profiles that have been built by clustering voices captured by the microphone over at least a time period, and selecting, from among the speaker profiles, a speaker profile having second voice features closest to the second voice features of the captured voice, the speaker identifier being an identifier of the selected speaker profile.

13. The apparatus of claim 11, wherein the second voice features are selected the group consisting of:

Mel-frequency cepstral coefficients (MFCC),
Bark frequency cepstral coefficients (BFCC), and
Linear Predictive Cepstrum Coefficients (LPCC).

14. A non-transitory storage medium storing program code instructions that, when executed on a computer or a processor, cause the computer or the processor to:
- extract first voice features representative of a temporal voice activity captured by a microphone;
- detect a voice-related network stream generated by at least one user device in a network traffic generated by at least one of a plurality of user devices and traversing a network device, and associate a device identifier with the detected voice-related network stream;
- extract traffic features representative of a temporal activity of network traffic of detected voice-related network streams generated by the at least one device in the network traffic traversing the network device; and
- when the first voice features and the traffic features are correlated, associating the device identifier with an identifier of the speaker, wherein the identifier of the speaker is determined using second voice features representative of speakers.

* * * * *